United States Patent [19]

Shtarkman

[11] Patent Number: 4,560,150
[45] Date of Patent: Dec. 24, 1985

[54] DRY VISCOUS SPRING STRUT

[75] Inventor: Emile M. Shtarkman, Cleveland, Ohio

[73] Assignee: Imperial Clevite Inc., Glenview, Ill.

[21] Appl. No.: 554,905

[22] Filed: Nov. 25, 1983

[51] Int. Cl.⁴ .................... B60G 11/62; F16F 13/00
[52] U.S. Cl. .................... 267/35; 188/268; 267/63 A; 267/140.1; 267/140.3; 267/152
[58] Field of Search ............ 267/8 R, 35, 63 A, 64.11, 267/64.27, 64.28, 68, 113, 116, 121, 122, 123, 136, 139, 140, 140.1, 140.3, 140.4, 140.5, 141, 141.1, 141.2, 141.3, 141.4, 141.5, 141.6, 141.7, 152, 153; 188/266, 268, 269, 372; 248/562, 636

[56] References Cited

U.S. PATENT DOCUMENTS

| 871,186 | 11/1907 | Rosenzweig | 267/35 |
|---|---|---|---|
| 1,141,360 | 6/1915 | Rudd | 267/64.27 |
| 1,886,712 | 11/1932 | Messier | 267/64.15 |
| 2,460,116 | 1/1949 | Bazley | 188/268 X |
| 3,121,479 | 2/1964 | Dillenburger et al. | 188/269 |
| 3,130,965 | 4/1964 | Niclas | 267/64.27 |
| 3,160,407 | 12/1964 | Vaugoyeau | 267/141 X |
| 3,285,596 | 11/1966 | Burgert | 188/268 X |
| 3,380,557 | 4/1968 | Peterson | 188/374 |
| 3,424,448 | 1/1969 | Chak Ma | 267/35 |
| 3,658,314 | 4/1972 | Luzsicza | 267/121 |
| 3,687,440 | 8/1972 | Jarret et al. | 267/141 |
| 3,897,856 | 8/1975 | Pineau | 267/140.3 X |
| 4,005,858 | 2/1977 | Lochner | 267/136 |
| 4,011,929 | 3/1977 | Jeram et al. | 188/268 |
| 4,052,088 | 10/1977 | Nicholls | 280/708 |
| 4,234,172 | 11/1980 | Takahashi | 267/8 R |
| 4,352,487 | 10/1982 | Shtarkman | 267/35 |
| 4,401,298 | 8/1983 | Eaton et al. | 267/140.1 |
| 4,504,044 | 3/1985 | Shtarkman | 267/140.1 X |

FOREIGN PATENT DOCUMENTS

| 446532 | 2/1948 | Canada | 267/140.1 |
|---|---|---|---|
| 137271 | 8/1979 | German Democratic Rep. | |
| 760 | of 1898 | United Kingdom | 267/64.27 |
| 504598 | 4/1939 | United Kingdom | 267/63 A |
| 626747 | 7/1949 | United Kingdom | 188/268 |
| 698953 | 10/1953 | United Kingdom | |
| 971795 | 10/1964 | United Kingdom | |
| 1152526 | 5/1969 | United Kingdom | |
| 1267637 | 3/1972 | United Kingdom | |
| 1500074 | 2/1978 | United Kingdom | |
| 2004349 | 3/1979 | United Kingdom | |
| 1543340 | 4/1979 | United Kingdom | |
| 2027517 | 2/1980 | United Kingdom | |
| 2055172 | 2/1981 | United Kingdom | |
| 1601444 | 10/1981 | United Kingdom | |
| 2129089 | 5/1984 | United Kingdom | |

Primary Examiner—Bruce H. Stoner, Jr.
Assistant Examiner—Richard R. Diefendorf
Attorney, Agent, or Firm—Russell E. Baumann

[57] ABSTRACT

A dry viscous spring strut is provided having at least a top outer housing member, a bottom outer housing member, a shear spring elastomerically associating the top outer housing member to the bottom outer housing member, a selectively pressurizable gas chamber, a subchamber disposed in association with the gas chamber including a plurality of elastomeric particles, a rigid structural member associated with the top outer housing member, and a bearing portion associated with the bottom outer housing member to receive the structural member. The structural member is received in the bearing portion to bear side loading forces to the strut and to limit nonaxial deformation of the strut. Relative movement between the top and the bottom housing members operates to stress the shear spring and the elastomeric particles, vary the pressurization of the gas chamber and subchamber, and vary the positioning of the structural member relative to the bearing portion to absorb shock and dissipate energy imparted to the strut. At least one of the housing members includes a casing wall contiguous to the shear spring configured in an arcuate bell-like form to accommodate deformation of the shear spring during compression of the strut.

12 Claims, 4 Drawing Figures

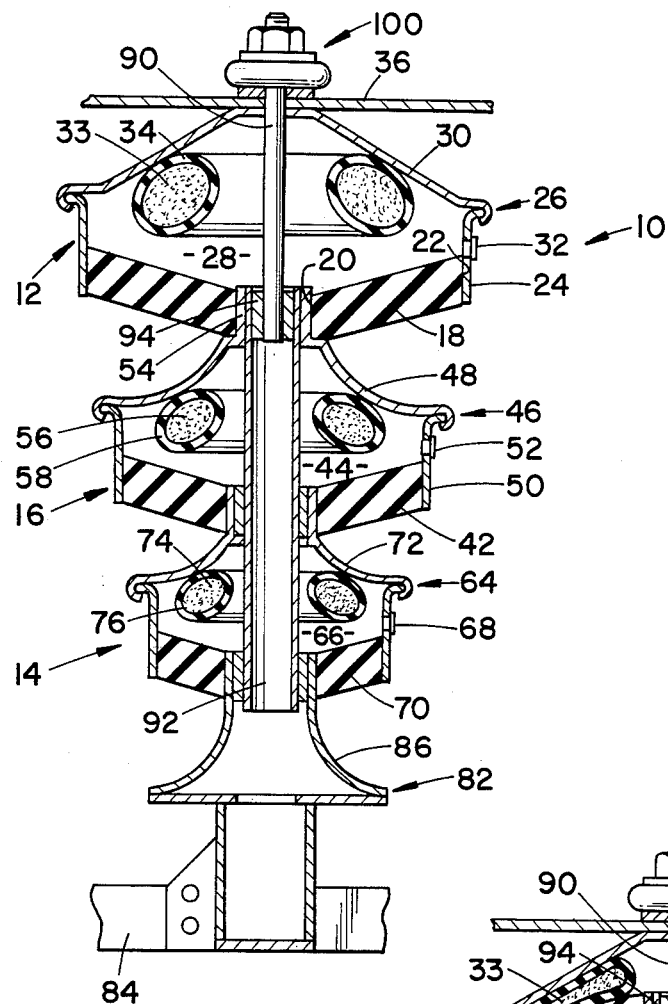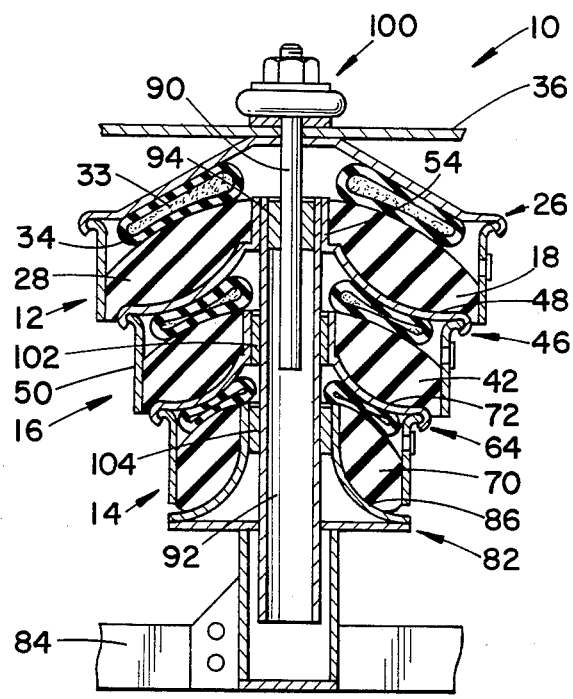

DRY VISCOUS SPRING STRUT

BACKGROUND OF THE INVENTION

The present invention relates generally to load carrying devices. More particularly, it relates to shock absorbing devices of the type which are mounted to vehicles and which use both an elastomeric spring and a selectively pressurizable chamber for absorbing shock, energy dissipation and carrying and leveling load. However, it will be appreciated by those skilled in the art that the invention can be readily adapted for use in other environments as, for example, where similar spring damping devices are employed to protect or cushion other items.

Known dry viscous spring damper devices of the type described have included elastomeric shear springs, elastomeric diaphragms, selectively pressurizable gas chambers and subchambers including elastomeric composite particles or fluid. Such a dry viscous spring damper device is described in application Ser. No. 436,331, filed Oct. 25, 1982, now U.S. Pat. No. 4,504,044 in the name of Shtarkman and assigned to the assignee of the subject application. In the Shtarkman application a dry viscous spring damper is provided which is comprised of a first housing member joined to a second housing member with an elastomeric shear spring. A first chamber in the damper is separated from a second chamber in the damper by an elastomeric diaphragm. A valve is provided for selectively pressurizing the second chamber with pressurized gas or air. A plurality of elastomeric particles are included in the first chamber whereby relative movement between the housing members operates to stress the shear spring and the elastomeric particles and vary the volumes of the first and second chambers.

A particular problem with viscous spring dampers is the lack of effective control over the form of deformation of the springs of such devices. Where a shear stress compels a spring into frictional engagement with a contiguous rigid member, the friction wears away the spring to shorten its life and weaken it. In addition, such frictional engagement limits the natural deformation of the spring to affect its operation.

Another particular problem with prior spring dampers is damper responsive instability due to nonaxial vibration, loading and deformation. Such nonaxial deformation may comprise conical twisting or rotation of the respective housing members to a different degree about the axis of the damper. Such instability is enhanced particularly where the damper is loaded to a substantially commpressed state which imparts high shear forces to the elastomeric shear spring.

Spring struts are load supporting devices which absorb shock and dissipate energy but are primarily limited to absorbing dissipation in a single axial dimension only. A rigid structural member bears side or nonaxial forces. Accordingly, nonaxial deformation is generally not present in a strut.

The present invention comprises a new and improved device which overcomes the energy absorption and frictional deformation problems of prior dry viscous spring dampers by combining the advantageous features of a dry viscous spring damper with structural means for generally limiting deformation of the device in an axial direction only and by providing surfaces contiguous to the strut shear springs to allow nonfrictional deformation. The subject invention is simple in design, economical to manufacture, readily adaptable to a plurality of energy dissipation uses, and provides improved shock absorption and energy dissipation.

BRIEF SUMMARY OF THE INVENTION

In accordance with the present invention there is provided a dry viscous spring strut for damping and leveling structural agitation comprising a first outer housing, a second outer housing and an inner housing intermediate of the first and second outer housings. The first outer housing includes a first elastomeric shear spring and a first particle chamber including a plurality of elastomeric particles. The second outer housing includes a second elastomeric shear spring and a second particle chamber including a plurality of elastomeric particles. The inner housing has an inner elastomeric shear spring joining the inner housing to the second outer housing, and an inner selectively pressurizable gas chamber. A mating rod and tubing assembly is provided to restrict the strut to generally relative axial motion only between the first and second outer housings whereby relative movement between the housings operates to stress the shear springs and the elastomeric particles and adjust pressurization of the particle and gas chambers. Additionally, as is obvious from the drawings, relative rotational movement of the housings about the axis can occur.

In accordance with another aspect of the invention, the rod and tubing assembly includes a rod associated with the first outer housing and a tubing associated with the second outer housing. Upon compressive axial deformation of the device the rod is telescoped within the tubing. The rod is closely received in a bearing member of the tubing to limit nonaxial deformation of the device.

It is a principal object of the present invention to provide an improved dry viscous spring strut having improved operating characteristics.

It is another object of the invention to provide a dry viscous spring strut having a load supporting and energy dissipating capability.

It is yet another object of the invention to provide a dry viscous spring strut having a rigid structural member for limiting nonaxial deformation of the strut.

Other objects and advantages for the subject new dry viscous spring strut will become apparent to those skilled in the art upon a reading and understanding of the specification.

BRIEF DESCRIPTION OF THE DRAWINGS

The invention may take physical form in certan parts and arrangements of parts, one and two alternative embodiments of which will be described in detail in the specification and illustrated in the accompanying drawings which form a part hereof and wherein:

FIG. 1 is a cross-sectional, elevational view of a dry viscous spring strut constructed in accordance with the present invention and shown in a free state;

FIG. 2 is a cross-sectional, elevational view showing the spring strut of FIG. 1 in a compressed state;

DETAILED DESCRIPTION OF THE INVENTION

Figure 3:
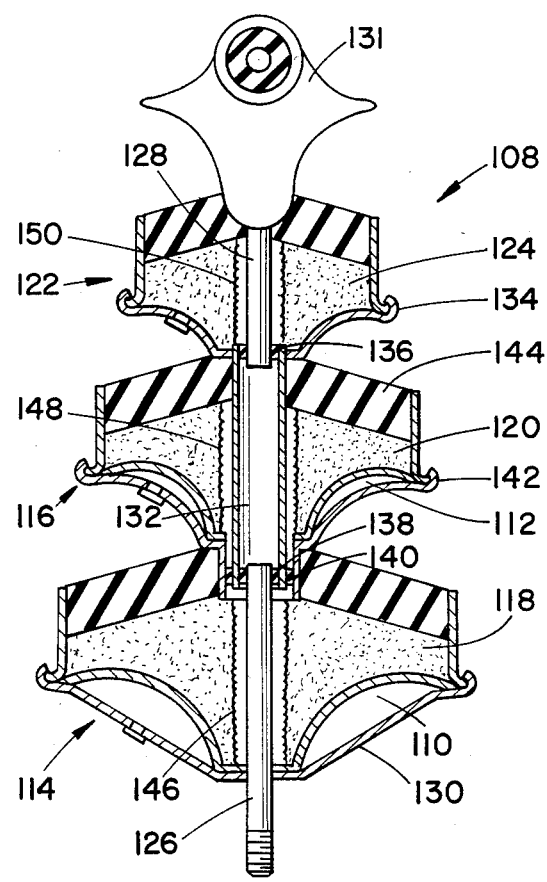
FIG. 3 is a cross-sectional, elevational view of one alternative embodiment of a dry viscous spring strut constructed in accordance with the present invention and shown in a free state; and, FIG. 4 is a cross-sectional, elevational view of a second alternative embodiment of a dry viscous spring strut constructed in accordance with the present invention and shown in a free state.

Referring now to the drawings wherein the showings are for purposes of illustrating the invention only and not for purposes of limiting the same, FIGS. 1 and 2 show a dry viscous spring strut 10 for damping and leveling structural agitation. The strut 10 is comprised of a first outer housing 12, a second outer housing 14 and an inner housing 16 intermediate of the first and second outer housings.

The first or top outer housing 12 includes an associated first elastomeric shear spring 18 comprising a generally obtuse cup configuration. The shear spring 18 has an inner annular port 20 for reception of and bonding to a portion of the inner housing 16. The outer terminal end 22 of the first elastomeric shear spring 18 is bonded to the outer casing wall 24 of the first outer housing 12. The casing 26 of the first outer housing 12 is generally of a cuplike form to define a first chamber 28 between the casing 26 and the elastomeric shear spring 18. The casing is preferably constructed of a rigid material such as steel and includes an inner casing wall 30 depending or sealably joined to the outer casing wall 24. A valve 32 allows access to the first chamber 28 for selective pressurizatiion of the chamber.

The first chamber 28 includes a first subchamber 33 defined by an annular elastomeric tubing 34. The subchamber 33 preferably includes a plurality of elastomeric particles disposed therein for dissipating energy through resilient deformation resulting from shock or vibration to the subchamber 33. Selective pressurization of the first chamber 28 varies the pressure on the subchamber 33 and the elastomeric particles contained therein. The first outer housing 12 is preferably fastened to an external support member or support base 36.

The inner housing 16, similar to the first outer housing 12, includes an inner housing elastomeric shear spring 42 which defines a selectively pressurizable gas chamber 44 between the shear spring and the inner housing casing 46. The inner housing casing 46 includes an inner casing wall 48 and an outer casing wall 50 including a valve 52 for selective pressurization of chamber 44. The inner casing wall 48 has a cylindrical end portion 54 which is bonded to the annular port 20 of the first housing elastomeric shear spring 18 to associate or join the inner housing 16 to the first outer housing 12. Inner casing wall 48 arcuately depends from the cylindrical end portion 54 towards outer casing wall 50 to form a bell-like configuration. Such a configuration better accommodates deformation of shear spring 18 upon compression of the strut 10. Inner housing selectively pressurizable chamber 44 is illustrated as including a selectively pressurizable subchamber 56 which also preferably includes a plurality of elastomeric particles therein. The subchamber 56 is defined by an annular elastomeric tubing 58. However, it is within the scope of the invention to delete the subchamber 56 from the housing assembly.

The second or bottom outer housing 14 is similarly configured to the inner housing 16 but includes a smaller diameter second outer housing casing 64 sized to avoid contact with the inner housing casing 50 upon compression of the strut 10. The second or bottom housing 14 includes a second selectively pressurizable chamber 66 that is pressurized through valve 68. The chamber 66 is defined between the casing 64 and the associated second outer housing elastomeric shear spring 70. The outer housing casing 64 includes a bell-like configured inner casing wall 72 having a cylindrically configured end portion for association by bonding to the inner housing elastomeric shear spring 42. Such bonding provides connection between the inner housing 16 and the second outer housing 14. An optional subchamber 74 defined by an annular tubing 76 also preferably includes a plurality of elastomeric particles.

The second outer housing shear spring 70 is bonded to a base support member 82 which in turn may be fastened to a second support base 84 for the strut 10. The support member 82 includes an arcuate, bell-shaped wall 86 contiguous to shear spring 70.

A rigid structural member is included in the strut to bear side or nonaxial loading of the strut and to limit nonaxial deformation while permitting axial and relative rotational movement about the member. The axis of the strut is defined by the rigid structural member which preferably comprises a mating rod 90 and tubing 92. The tubing includes a bearing portion 94 for sliding reception of the rod 90 during deformation of the strut 10. The bearing portion preferably comprises a self-lubricating metal bearing.

With particular reference to FIGS. 1 and 2, the rod 90 is fixed with a conventional fastening device 100 to the first support base 36 and the casing 26 of the first outer housing 12. Upon relative movement between the base support member 82 and casing 26, the housing elastomeric shear springs 18, 42, 70 are stressed to allow telescopic movement between the rod 90 and tubing 92 according to the relevant movement between the support bases 36, 84. The rod 90 is closely received in the bearing portion 94 of the tubing 92 to limit the deformation of the strut 10 only along the axis of the rod 90 and tubing 92.

With particular reference to FIG. 2, it may be seen that tubing 92 is fixed relative to the inner casing wall 48 of the inner housing 16 and in particular is fixed relative to the cylindrical end portion 54 of the wall. Upon contraction of the strut 10, the inner housing 16 is telescoped into the first outer housing 12 to stress the shear spring 18, compress the first chamber 28 and subchamber 33, and deform both the elastomeric annular tubing 34 and the elastomeric particles contained in the subchamber 33. In addition, tubing 92 is telescoped into the first outer housing 12 in accordance with the deformation of the shear spring 18 and the extent of movement of the inner housing casing 46. Thus, the tubing 92 has moved from the position illustrated in FIG. 1 wherein bearing portion 94 is substantially adjacent the terminal end of the rod 90, to a second position wherein bearing portion 94 is adjacent an intermediate portion of the rod 90. Although the tubing 92 is fixed relative to the first elastomeric shear spring and the inner housing casing 46, it is not fixed relative to either the inner housing elastomeric shear spring 42 or the second outer housing elastomeric shear spring 70. An inner housing bearing portion 102 and a second outer housing bearing portion 104 engage the outer side wall surface of tubing 92 to allow relative movement of the tubing 92 relative to the second outer housing casing 64 and the base support member 82.

The inner casing walls 48, 72, 86 of the inner housing 16, second outer housing 14 and base support member 82 are particularly configured in an arcuate bell-shaped form to provide a nonabrasive engagement surface for the contiguous elastomeric shear springs 18, 42, 70 during deformation of the strut 10. Upon compression of the strut, such an arcuate configuration allows the shear springs to engage the casing walls without sliding against the casing walls during continued deformation or vibrational movement. Avoiding such frictional engagement prolongs the useful life of the shear springs and therefore maintains consistent operating characteristics and a prolonged life for the strut 10.

The housings 12, 14, 16 are aligned to form a generally conical configuration in that the respective casings include a reduced overall diametric dimension from the adjacent housing to allow reception of the housing during deformation without abutting engagement between rigid casing members. More particularly, the diametrical dimension of the inner housing casing 46 is less than the diametrical dimension of the outer casing wall 24 of the first outer housing 12. As illustrated in FIG. 2, upon reception of the inner housing 16 within the first outer housing 12 the outermost radial extent of the inner housing casing wall 48 is still less than the radial extent of the casing wall 24 of the first outer housing. Similarly, the second outer housing includes a casing 64 having a diametrical dimension less than the outer casing wall 50 of the inner housing.

With particular reference to FIG. 3, an alternative embodiment of the invention is illustrated. In this embodiment, a strut 108 is provided which includes selectively pressurizable gas chambers 110, 112 in the first outer housing 114 and the inner housing 116, respectively. A plurality of elastomeric particles is included in subchamber 118 of the first outer housing and subchamber 120 of the inner housing. The second outer housing 122 includes a chamber 124 filled with elastomeric particles.

A rigid structural member to limit nonaxial deformation of the strut 108 includes a first rod 126 fixed relative to the casing 130 of the first outer housing 114 and which may be fastened to a first support base (not shown). A second rod 128 is fixed relative to a second support base 131. A tubing 132 receives the rods 126, 128 upon deformation of the strut 108 to a more compressed state. The tubing 132 is fixed relative to the casing 134 of the second outer housing 122. A first bearing portion 138 is interposed between the first rod 126 and the tubing 132 to receive the first rod upon telescopic movement of the first rod 126 within the tubing 132. A second bearing portion 136 closely receives the second rod 128 upon telescopic movement of the rod 128 within the tubing 132. A third bearing portion 140 is interposed between the tubing 132 and the casing 142 of the inner housing 116 to allow relative movement of the tubing 132 relative to the inner housing 116. The tubing is also fixed relative to the inner housing elastomeric shear spring 144. Deformable sealing gaskets 146, 148, 150 are included about the first rod 126, the tubing 132, and the second rod 128, respectively. The sealing gaskets 146, 148, 150 prevent the elastomeric particles contained within the housings from interfering with the movement of the rod and tubing such as by becoming lodged between the bearing portions.

Figure 4:
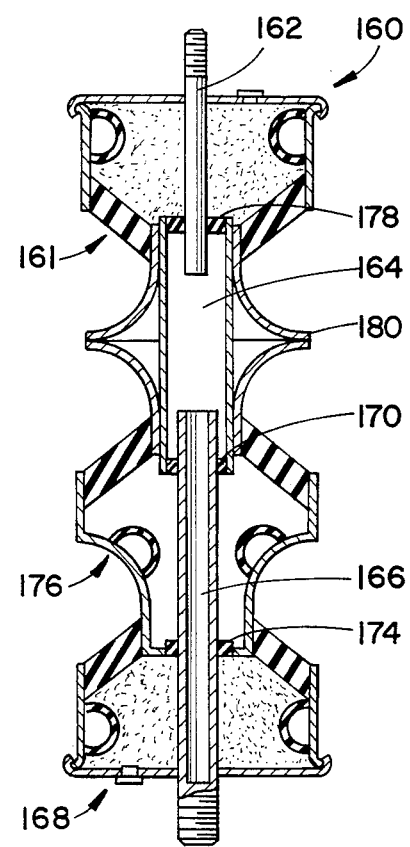

With particular reference to FIG. 4 a second alternative embodiment of a dry viscous spring strut 160 formed in accordance with the invention is illustrated. In this embodiment, a rod 162 is fixed to a first outer housing member 161 and is closely received in a first tubing member 164 by means of a bearing portion 178.

A second tubing member 166 is fixed relative to a second outer housing member 168 and is closely received in the first tubing member 164 by means of bearing 170. First tubing bearing portion 170 bears relative movement between the second tubing 166 and the first tubing 164. The inner housing bearing portion 174 bears relative movement between second tubing 166 and the inner housing 176. The bearing portion 178 also bears relative movement between the rod 162 and the first tubing 164 upon compression of the strut 160. The first tubing is fixed relative to first tubing casing 180.

Upon compression of strut 160, the first tubing 164 closely receives rod 162 at bearing portion 178 and closely receives second tubing 166 at bearing portion 170. Upon compression the rod 162 may ultimately be received within the second tubing 166 to closely limit nonaxial deformation from the axis of the rod and tubing assembly. However, it may be seen that the tubing and rod assembly does not limit rotational movement about its axis. It may also be seen that the chamber defined by the internal volumes of first and second tubing members can be used as a variably pressurizable gas chamber in association with the relative movement of the close fitted rod in the tubing.

The invention has been described with reference to several alternative embodiments. Obviously, modifications and alterations will occur to others upon the reading and understanding of the specification. It is our intention to include all such modifications and alterations insofar as they come within the scope of the appended claims or the equivalents thereof.

Having thus described our invention, we now claim:

1. A dry viscous spring strut for damping and leveling structural agitation comprising:

a first outer housing, a second outer housing and an inner housing intermediate of said first and said second outer housings;

said first outer housing including a first elastomeric shear spring;

said second outer housing including a second elastomeric shear spring;

said inner housing having an inner elastomeric shear spring joining said inner housing to said second outer housing;

at least one of said housings having a selectively pressurizable gas chamber;

at least one of said housings having a particle chamber including a plurality of elastomeric particles; and, a mating rod and tubing assembly to restrict said strut to generally relative axial motion only between said first and second outer housings whereby relative movement between said housings operates to stress said shear springs and said elastomeric particles and adjust pressurization of said particle and gas chambers.

2. The strut as defined in claim 1 wherein said inner housing includes an inner gas chamber and a subchamber within said inner gas chamber.

3. The strut as defined in claim 2 wherein said subchamber includes a plurality of elastomeric particles.

4. The strut as defined in claim 2 wherein said subchamber is selectively pressurizable.

5. The strut as defined in claim 1 wherein said rod is sized for close reception in said tubing and said tubing includes a gas chamber for variable pressurization in association with relative movement of said rod to said tubing.

6. The strut as defined in claim 5 wherein said tubing includes a bearing portion for engaging said rod.

7. The strut as defined in claim 1 wherein at least one of said housings includes an outer casing wall contiguous to at least one of said shear springs configured in an arcuate bell-like form to accommodate deformation of said at least one shear spring.

8. A spring strut having a top outer housing member, a bottom outer housing member, a shear spring elastomerically associating said top outer housing member to said bottom outer housing member, a selectively pressurizable gas chamber, a subchamber disposed in association with said gas chamber including a plurality of elastomeric particles, a rigid structural member associated with said top outer housing member, and a bearing portion associated with said bottom housing member to receive said structural member whereby relative movement between said top and said bottom housing members operates to stress said shear spring and said elastomeric particles, vary the pressurization of said gas chamber and subchamber, and vary positioning of said structural member relative to said bearing portion and said bottom housing member to absorb shock and dissipate energy imparted to said strut while preventing nonaxial movement.

9. The spring strut as claimed in claim 8 wherein said structural member comprises a rod fixedly attached to said top housing member and said bearing portion comprises a tube including a bearing member for receiving said rod.

10. The spring strut as claimed in claim 9 wherein said bearing member comprises self-lubricating bearing member fixed at an end of said tube adjacent said rod.

11. The strut as defined in claim 8 wherein at least one of said housings includes an outer casing wall contiguous to said shear spring configured in an arcuate bell-like form to accommodate deformation of said shear spring.

12. A spring strut having a top outer housing member, a bottom outer housing member, an inner housing member, shear springs elastomerically associating said top, bottom and inner housing members together, a first selectively pressurizable gas chamber, a subchamber disposed in association with said first gas chamber including a plurality of elastomeric particles, a second selectively pressurizable gas chamber and subchamber associated with said inner housing, a rigid structural member associated with said top outer housing member and a bearing portion associated with said bottom housing member to receive said structural member whereby relative movement between said top and said bottom housing members operate to stress said shear springs and said elastomeric particles, varying the pressurization of said gas chamber and subchamber and vary positioning of said structural member relative to said bearing portion and said bottom housing member to absorb shock and dissipate energy imparted to said strut.

* * * * *